United States Patent [19]

Bianchi

[11] 4,450,621

[45] May 29, 1984

[54] METHOD AND TOOL FOR PREPARING COAXIAL CABLE AND FOR POSITIONING COAXIAL CONNECTOR THEREWITH

[75] Inventor: Edward A. Bianchi, Hummelstown, Pa.

[73] Assignee: AMP Incorporated, Harrisburg, Pa.

[21] Appl. No.: 330,626

[22] Filed: Dec. 14, 1981

[51] Int. Cl.³ ........................ H01B 13/20; B23Q 9/00

[52] U.S. Cl. .................................... 29/828; 29/564.2; 29/748; 269/87.3; 408/97; 408/115 R

[58] Field of Search ...................... 29/828, 748, 564.2; 174/71 R, 72 R, 71 C; 269/87.3, 152, 903; 408/113, 114, 115 R, 103, 97; 339/97 P

[56] References Cited

U.S. PATENT DOCUMENTS

| | | | |
|---|---|---|---|
| 1,977,677 | 10/1934 | Hill | 173/324 |
| 2,694,182 | 11/1954 | Edlen et al. | 174/71 C |
| 3,344,370 | 9/1967 | Sewell | 29/828 X |
| 3,486,216 | 12/1969 | Cimolino | 29/427 |
| 3,537,337 | 11/1970 | Best | 269/87.3 X |
| 3,694,100 | 9/1972 | Blair | 269/87.3 X |
| 3,707,756 | 1/1973 | Wolyn | 29/748 |
| 3,778,531 | 12/1973 | Higgins | 29/828 X |
| 3,895,434 | 7/1975 | Adams et al. | 29/748 X |
| 4,117,749 | 10/1978 | Economu | 81/9.5 R |
| 4,120,554 | 10/1978 | Bianchi et al. | |
| 4,370,015 | 1/1983 | Hutter et al. | 339/97 P |

*Primary Examiner*—Mark Rosenbaum
*Assistant Examiner*—Carl J. Arbes
*Attorney, Agent, or Firm*—Adrian J. LaRue

[57] ABSTRACT

A tool comprises clamping members that clampingly engage a coaxial cable. Drill blocks are secured together onto a plate to which the clamping members are secured and they include opposing holes centrally disposed relative to the clamped cable to enable a drill to pass therethrough to drill opposed openings through the jacket and shielding and into the dielectric sheathing around the center conductor, whereafter the drill blocks are removed. A housing of the coaxial connector containing stationary and movable signal probes is mounted on the plate to position the signal probes relative to the drilled holes whereafter the moveable signal probe is moved into electrical connection with the center conductor and ground conductor members penetrate the jacket and electrically connect with the shielding.

9 Claims, 10 Drawing Figures

METHOD AND TOOL FOR PREPARING COAXIAL CABLE AND FOR POSITIONING COAXIAL CONNECTOR THEREWITH

FIELD OF THE INVENTION

This invention relates to a tool, and more particularly to a tool for preparing a coaxial cable and for positioning and connection of a coaxial connector therewith.

BACKGROUND OF THE INVENTION

U.S. Pat. No. 4,120,554 and U.S. patent application Ser. Nos. 139,035 now abandoned and 252,512 filed respectively Apr. 10, 1980 and Apr. 8, 1981 and incorporated entirely as references herein disclose a coaxial connector tap that is electrically connected to the center conductor and outer conductor of a coaxial cable. The center conductor connection is made by opposing signal probes, one of which is movably forced through the protective jacket, outer conductor and dielectric sheath toward the stationary probe until both probes electrically connect the center conductor while being insulated from the outer conductor. This coaxial connector tap has proven to provide effective coaxial tap connections.

The FCC has promulgated specifications for effectively shielding signal conductors and connections therebetween to preclude signal interference and cross talk problems. In this regard, coaxial cables to which the coaxial connector tap of the above patent and patent applications are to be connected include double layers of conductive foil and braid. Forcing of the signal probes through the shielding is quite difficult because of the double layers of shielding. This places undue forces on the signal probes and subjects them to damage. The probes in penetrating through the shielding carry parts thereof in toward the center conductor which can short the connection. The forces of center conductor connection with the signal probes severely distort the cable and misalignment of the center conductor and the signal probes therewith takes place. These factors cause unacceptable coaxial connections.

SUMMARY OF THE INVENTION

According to the present invention, a tool comprises clamping members that clampingly engage a coaxial cable. Drill blocks are secured together onto a plate to which the clamping members are secured and they include opposing holes centrally disposed relative to the clamped cable to enable a drill to pass therethrough to drill opposed openings through the jacket and shielding and into the dielectric sheathing around the center conductor, whereafter the drill blocks are removed. A housing of the coaxial connector containing stationary and movable signal probes is mounted on the plate to position the signal probes relative to the drilled holes whereafter the moveable signal probe is moved into electrical connection with the center conductor and ground conductor members penetrate the jacket and electrically connect with the shielding.

According to another aspect of the present invention, a method of making a coaxial connection comprises the steps of clamping a coaxial cable in a tool, positioning drill blocks on the tool relative to the cable, drilling opposing holes through the outer jacket and shielding and into the dielectric sheathing around the center conductor, positioning a coaxial connector on the tool in the same location the drill blocks were located, thereby aligning center conductor probes relative to the drilled holes and moving the probes into the drilled holes and into electrical connection with the center conductor.

DETAILED DESCRIPTION OF THE PREFERRED EMBODIMENT

Figure 1:
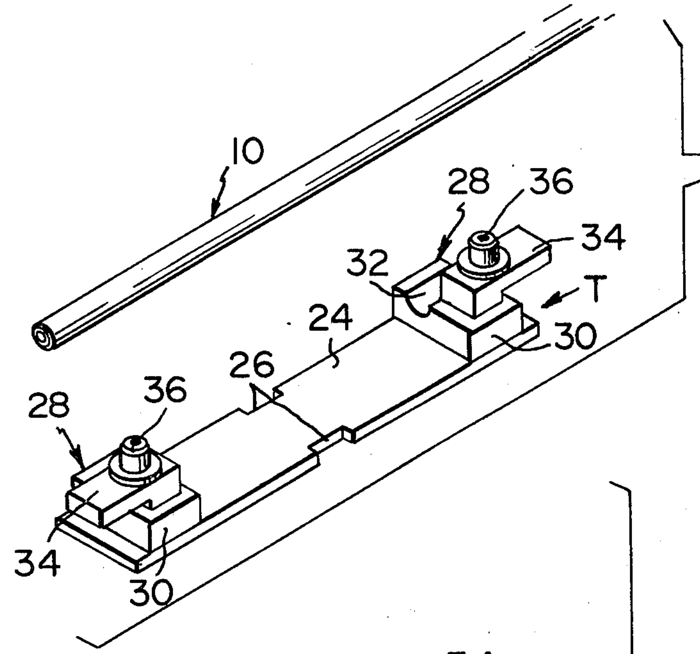
FIG. 1 is a perspective exploded view of a coaxial cable and tool.
Figure 2:
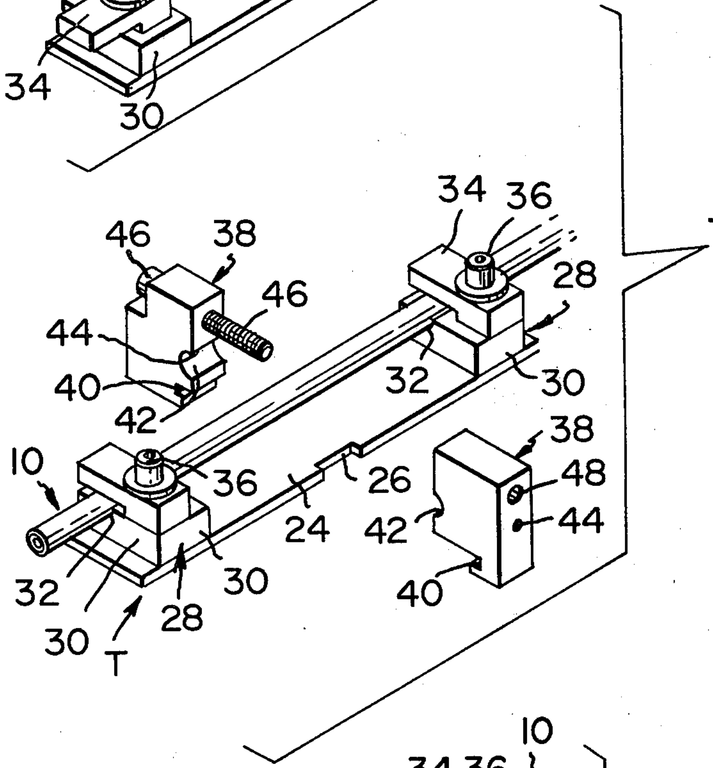
FIG. 2 is similar to FIG. 1 showing the coaxial cable clamped in the tool and drill blocks exploded therefrom.

FIGS. 1 through 7 illustrate the various steps for preparing coaxial cable 10 by the use of tool T and electrically connecting coaxial cable tap 12 thereto. As shown in FIG. 8, coaxial cable 10 comprises an outer insulating jacket 14, two layers of metal braid 16, two layers of metal foil 18, dielectric sheath 20 and center conductor 22. The reason for the double layers of metal braid 16 and metal foil 18 is to provide an outer shielding conductor of a coaxial cable that is acceptable to Federal Communications Commission Standards.

In order to electrically connect coaxial cable tap 12 to coaxial cable 10, tool T is utilized to prepare coaxial cable 10, and close positioning and connection of coaxial cable tap 12 therewith.

As shown in FIGS. 1 through 7, tool T comprises a metal plate 24 having opposing slots 26 centrally located therein and clamping members 28 secured adjacent the ends thereof. Each of clampng members 28 includes a metal block 30 secured on to metal plate 24 and having an arcuate recess 32 therein for receiving coaxial cable 10 therein. An L-shaped clamping member 34 is pivotally mounted onto metal block 30 via screws 36 which are operated by an Allen wrench (not shown). Arcuate recesses 32 have a sufficient diameter to accommodate a range of sizes of coaxial cable 10.

With coaxial cable 10 positioned in recesses 32 of metal blocks 30, clamping members 34 are pivoted and positioned thereover and screws 36 are tightened to clamp coaxial cable 10 in position in tool T preparatory to drilling opposing holes therein. In this connection, drill blocks 38 are mounted on plate 24 within opposing slots 26. Each drill block 38 includes a channel 40 for engagement with plate 24 and the width of the drill block is such so as to fit within a respective slot 26. An arcuate recess 42 is located in each drill block 38 to accommodate coaxial cable 10 and a hole 44 extends through drill block 38 in communication with the center of arcuate recess 42. A screw 46 is captured in one of drill blocks 38 for mateable engagement with a threaded hole 48 in the other drill block 38. In this manner, drill blocks 38 are mounted in position on plate 24 via channels 40 in opposing slots 26 and maintained in position thereon relative to coaxial cable 10 via screw 46 threadably engaging threaded hole 48 thereby tightly securing drill blocks 38 onto coaxial cable 10. Arcuate recesses 42 are provided with sufficient diameter to accommodate a range of sizes of coaxial cable 10 in the same manner as arcuate recesses 32 in clamping members 28.

Figure 3:
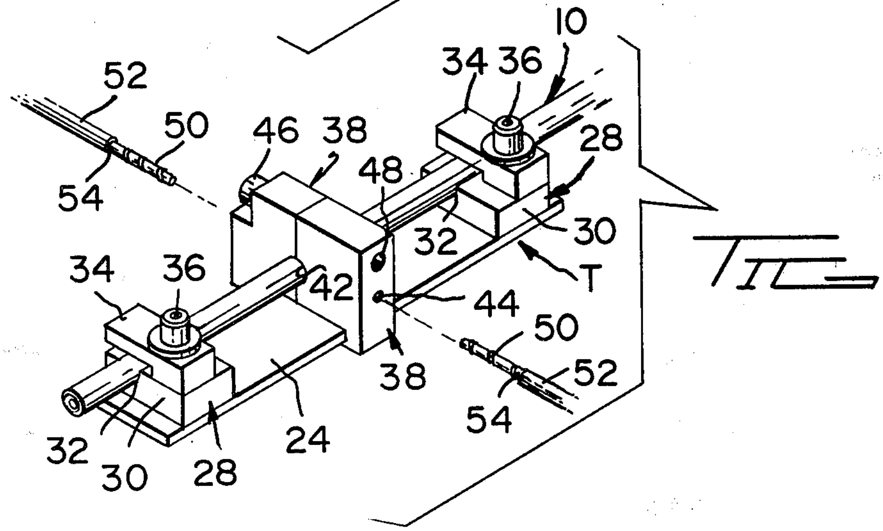
FIG. 3 is similar to FIG. 2 showing the drill blocks secured onto the plate and drill bits exploded therefrom.
Figure 8:
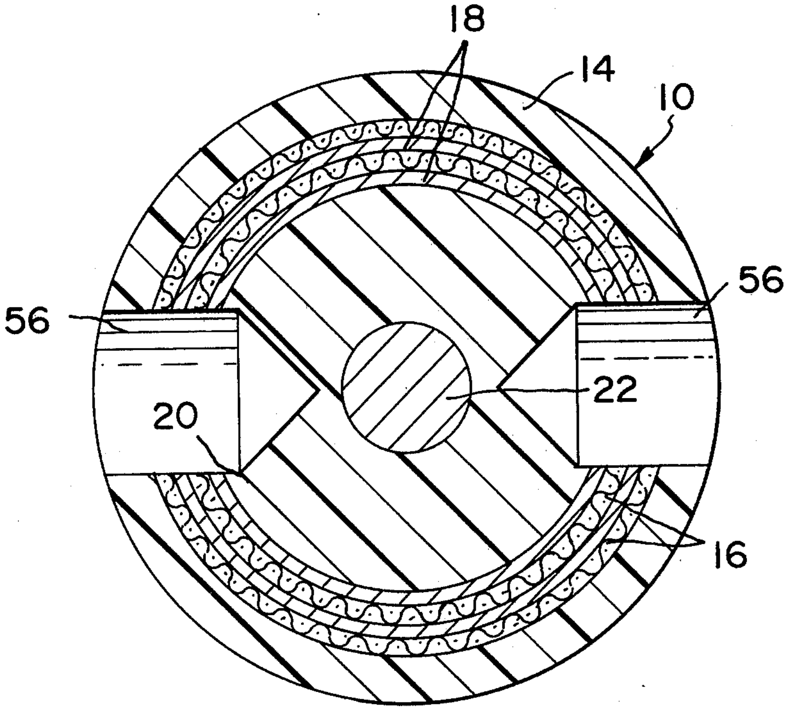
FIG. 8 is a cross-sectional view taken along line 8—8 of FIG. 4 showing the opposed drilled holes in the coaxial cable.
Figure 9:
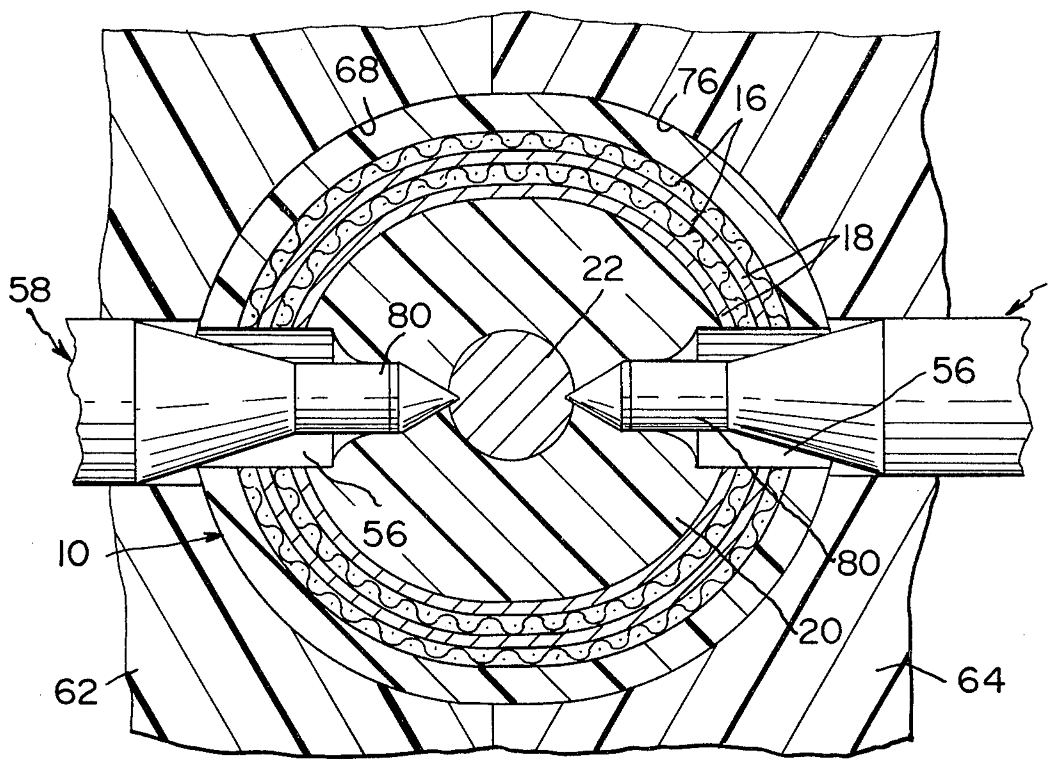
FIG. 9 is a cross-sectional view taken along line 9—9 of FIG. 7 showing the connection of the probes to the center conductor of the coaxial cable.

A drill member 50 as shown in FIG. 3 is operated by a conventional drill (not shown) for drilling opposed holes in coaxial cable 10 by insertion of drill member 50 within respective holes 44 which serve as guides for guiding drill member 50 relative to coaxial cable 10. Drill member 50 is provided with insulation 52 and a stop 54 to enable drill member 50 to be used while coaxial cable 10 is energized and stop 54 prevents drill member 50 from drilling coaxial cable 10 therebeyond. As shown in FIG. 8, opposed holes 56 are drilled into coaxial cable 10 via drill member 50, and, as illustrated, holes 56 extend through jacket 14, layers of metal braid 16, and metal foil 18 and into dielectric sheath 20 stopping short of center conductor 22. In this way, coaxial cable 10 is prepared to receive stationary center conductor probe 58 and moveable center conductor probe 60 of coaxial cable 12 as illustrated in FIG. 9. The reason that holes 56 are drilled into coaxial cable 10, is because of the difficulty of center conductor probes 58 and 60 penetrating through jacket 10 and double layers of metal braid 16 and metal foil 18 and the possibility of part of the shielding conductor being dragged along by the signal probes thereby shorting the connection.

Figure 4:
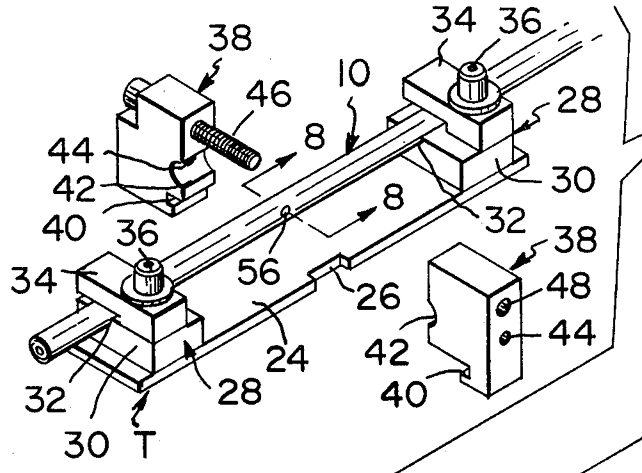
FIG. 4 is similar to FIG. 3 showing the removal of the drill blocks.
Figure 5:
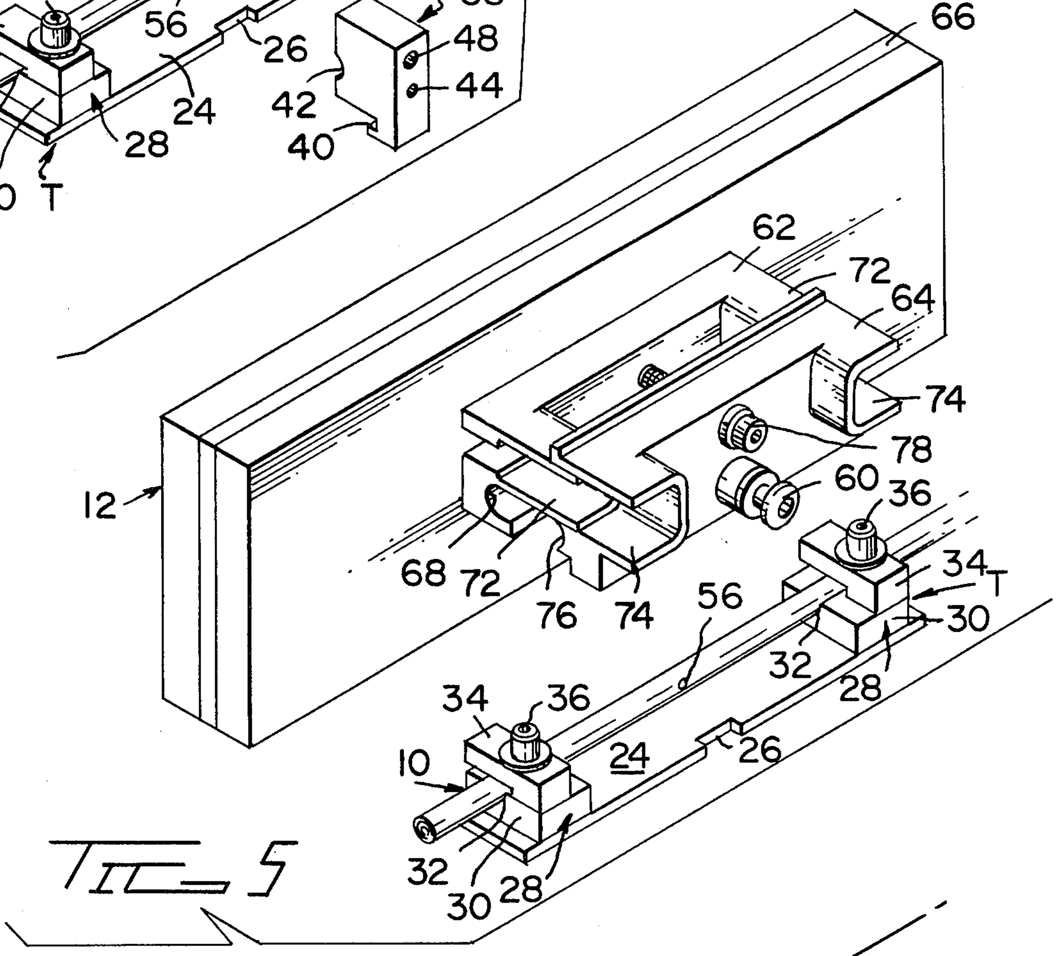
FIG. 5 is similar to FIG. 4 showing the coaxial connector tap exploded therefrom.
Figure 6:
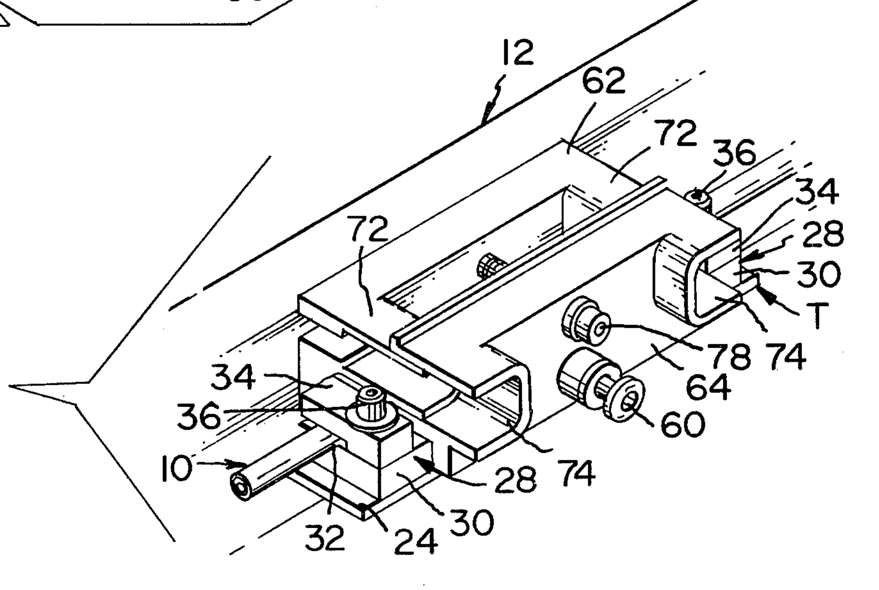
FIG. 6 is similar to FIG. 5 showing the coaxial connector tap positioned on the tool and coaxial cable prior to being electrically connected thereto.
Figure 10:
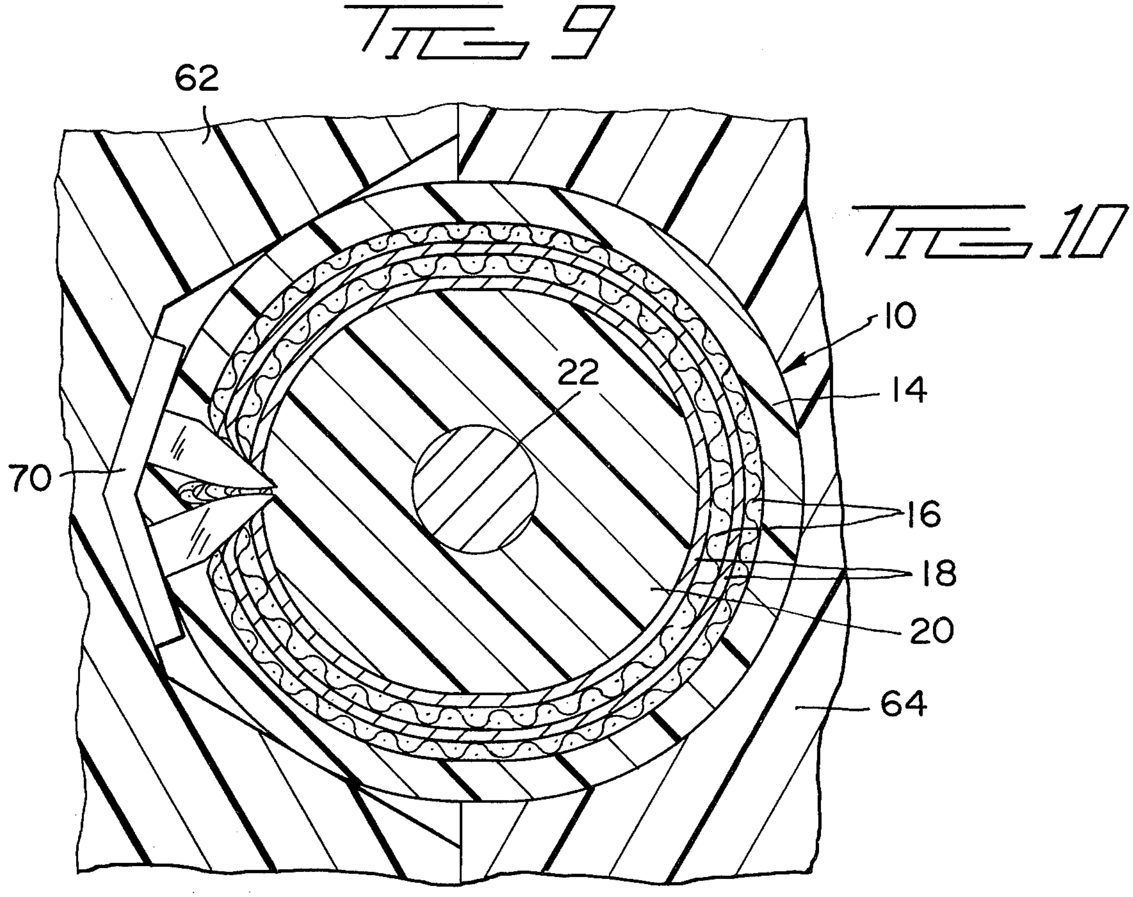
FIG. 10 is a cross-sectional view taken along line 10—10 of FIG. 7 showing the connection of the shield contacts with the outer shielding conductor members of the coaxial cable.

After holes 56 have been drilled in coaxial cable 10, drill blocks 38 are removed from plate 24 as shown in FIG. 4 and coaxial cable tap 12 is mounted on tool T with housing block member 62 and moveable member 64 movably mounted thereon positioned between clamping members 28 to position center conductor probes 58 and 60 relative to drilled holes 56. Coaxial cable tap 12 is of the general type disclosed in U.S. Pat. No. 4,120,554. Housing member 62 is part of the housing for housing a printed circuit board 66 and associated circuitry of coaxial cable tap 12 and in which stationary center conductor probe 58 is located centrally of an arcuate recess 68 in which the coaxial cable 10 is to be disposed. Braid-engaging contacts 70, one being shown in FIG. 10, are disposed on each side of stationary center conductor probe 58 within arcuate recess 68 for penetration through jacket 14 and in electrical engagement with the outer shielding conductor thereunder in accordance with the teaching of the above-mentioned patent and patent applications. U-shaped guide members 72 extend outwardly from housing member 62 and they serve as guide members for U-shaped members 74 of moveable member 64 which also has an arcuate recess 76 for engagement with coaxial cable 10. The diameter of arcuate recesses 68 and 76 is such so as to accommodate a range of sizes of coaxial cable 10. Moveable center conductor probe 60 is slidably mounted in moveable member 64 and is threadably moved therealong via an Allen wrench into electrical engagement with center conductor 22 after movable member 64 has been moved into engagement with coaxial cable 10 via screw 76 by means of an Allen wrench. The action of moving moveable member 64 relative to housing member 62 is performed by screw 76 thereby causing stationary center conductor probe 58 to move into respective hole 56 of coaxial cable 10, penetrate through the remainder of sheath 20 and into electrical engagement with center conductor 22 and braid-engaging contacts 70 to penetrate through jacket 14 into electrical engagement with the outer shielding conductor thereunder thereby securing coaxial cable tap 12 onto coaxial cable 10 whereafter moveable center conductor probe 60 is slidably moved along moveable member 64 causing center conductor probe 60 to penetrate through the remainder of sheath 20 and into electrical engagement with center conductor 22. Thus, electrical connection with the center conductor and shielding conductor of coaxial cable 10 is now completely effected. Tool T enables coxial cable tap 12 to be properly located relative to drilled holes 56 to properly align center conductor probes 58, 60 relative thereto prior to electrical termination being made with the shielding and center conductors thereof. In this way, effective termination is made without distortion of the coaxial cable and no parts of the shielding conductor is carried into the center conductor when probes 58 and 60 are electrically connected therewith. Moreover, probes 58 and 60 are provided with insulation 80 from the bases of the conical tips out to jacket 14 and therebeyond to prevent any shorting of the termination.

Figure 7:
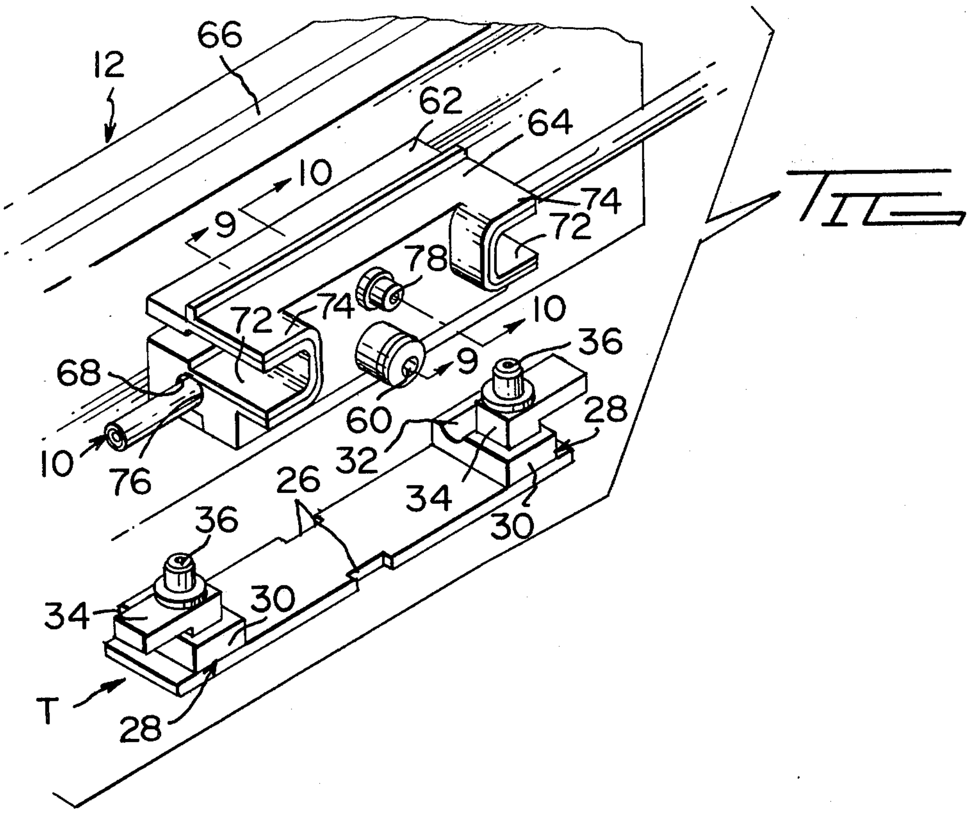
FIG. 7 is similar to FIG. 6 showing the coaxial cable with coaxial connector tap connected thereto being removed from the tool.

After coaxial cable tap 12 has been terminated to the shielding and center conductors thereof, clamping members 28 are unclamped from the coaxial cable and tool T is removed therefrom as shown in FIG. 7.

As pointed out above, cable 10 can be drilled when energized which enables coaxial connector tap 12 to also be electrically connected thereto while energized.

The invention is claimed in accordance with the following:

1. A method for preparing a coaxial cable and for positioning and connection of a coaxial connector therewith characterized by the steps of:

clamping the coaxial cable into spaced clamping members of a tool;

securing a drill block member onto said tool between the clamping members, the drill block member having a drill hole therethrough;

drilling a hole into the coaxial cable through the drill hole of the drill block member in alignment with a center conductor thereof;

removing the drill block member from the tool;

positioning a coaxial connector onto the tool between the clamping members so that a center connection member of the coaxial connector is aligned with the drilled hole; and moving the center connection member into the drilled hole in electrical connection with the center conductor.

2. A method as set forth in claim 1 characterized by the step of drilling opposed holes into the coaxial cable in alignment with the center conductor thereof and moving opposed center connection members of the coaxial connector into the opposed drilled holes in electrical connection at opposed locations with the center conductor.

3. A method as set forth in claim 1 characterized by the further step of unclamping and removing the tool from the coaxial cable after the coaxial connector is electrically connected thereto.

4. A method as set forth in claim 2 characterized by the further step of drilling the opposed holes in the coaxial cable short of the center conductor.

5. A method as set forth in claim 2 characterized by the further step of moving outer conductor-engaging connectors of the coaxial cable through an outer jacket thereof into electrical connection with the outer conductor of the coaxial cable.

6. A tool for preparing a coaxial cable and for positioning and connection of a coaxial connector therewith characterized in that:

a plate includes clamping members at spaced positions thereon in which the coaxial cable is clamped and including locating section means on said plate disposed between the clamping members;

drill block means securable onto said plate at said locating section means and in clamping engagement with the coaxial cable, at least one of said drill block means having a hole in aligment with a center conductor of the coaxial cable to enable a drill to drill at least one hole through the outer jacket and outer conductor and into the dielectric sheathing of the coaxial cable whereafter the drill block means are removed from said plate;

said clamping members serving to position the coaxial connector so that a signal probe thereof is in alignment with the drilled hole and is moved into the drilled hole in electrical connection with the center conductor whereafter said tool is unclamped and removed from the coaxial cable.

7. A tool as set forth in claim 6 characterized in that said drill block means have opposed holes so that opposed holes are drilled into the coaxial cable and along which opposed signal probes extend for electrical connection with the center conductor.

8. A tool as set forth in claim 6 characterized in that said clamping members include block members having arcuate recesses therein for receiving the coaxial cable and clamping arms pivotally mounted on said block members for clamping the coaxial cable in said arcuate recesses.

9. A tool as set forth in claim 7 characterized in that said locating section means comprise opposed slots and said drill block means have grooves matable with said respective slots, arcuate recesses in said drill block means for engagement with the coaxial cable and with which said holes communicate, and a screw member on one of said drill block means threadably matable with a threaded hole in the other of said drill block means for securing said drill block means on said plate and together.

* * * * *